United States Patent
Bhandwale et al.

(10) Patent No.: US 8,813,288 B2
(45) Date of Patent: Aug. 26, 2014

(54) SYSTEM AND METHOD FOR DETECTING IMBALANCE IN A WASHING MACHINE

(75) Inventors: Abhijeet A. Bhandwale, Louisville, KY (US); Richard Dean Suel, II, Louisville, KY (US); Paul Owen Davis, Louisville, KY (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 13/357,813

(22) Filed: Jan. 25, 2012

(65) Prior Publication Data

US 2013/0186199 A1 Jul. 25, 2013

(51) Int. Cl.
*D06F 33/02* (2006.01)

(52) U.S. Cl.
USPC .................................. 8/159; 68/12.06; 73/462

(58) Field of Classification Search
CPC .......... G01M 1/16; D06F 33/02; D06F 37/203
USPC .................................. 73/462; 68/12.06; 8/159
See application file for complete search history.

(56) References Cited

U.S. PATENT DOCUMENTS

| 5,070,565 | A | 12/1991 | Sood et al. |
| 5,677,606 | A | 10/1997 | Otake |
| 6,240,586 | B1 | 6/2001 | Joo |
| 6,282,965 | B1 | 9/2001 | French et al. |
| 6,393,918 | B2 | 5/2002 | French et al. |
| 6,640,372 | B2 | 11/2003 | Ciancimino et al. |
| 6,715,175 | B2 | 4/2004 | Ciancimino et al. |
| 7,765,837 | B2 | 8/2010 | Hoppe et al. |

*Primary Examiner* — John Chapman, Jr.
(74) *Attorney, Agent, or Firm* — Dority & Manning, P.A.

(57) ABSTRACT

Systems and methods for detecting an out of balance condition for a washing machine are disclosed. The wash basket of the washing machine is rotated at a constant predetermined rotational speed. If the washing machine has an unbalanced load, the wash tub will strike the cabinet as the basket rotates in the wash tub. The tub strikes cause the wash basket to lose momentum. The inverter drive control system causes the inverter to provide more current through the motor phases to the motor to maintain constant speed. From the value of the current, the severity of the tub strikes during a test period can be determined. An out of balance condition can be detected and measured based at least in part on the severity of the tub strikes.

13 Claims, 5 Drawing Sheets

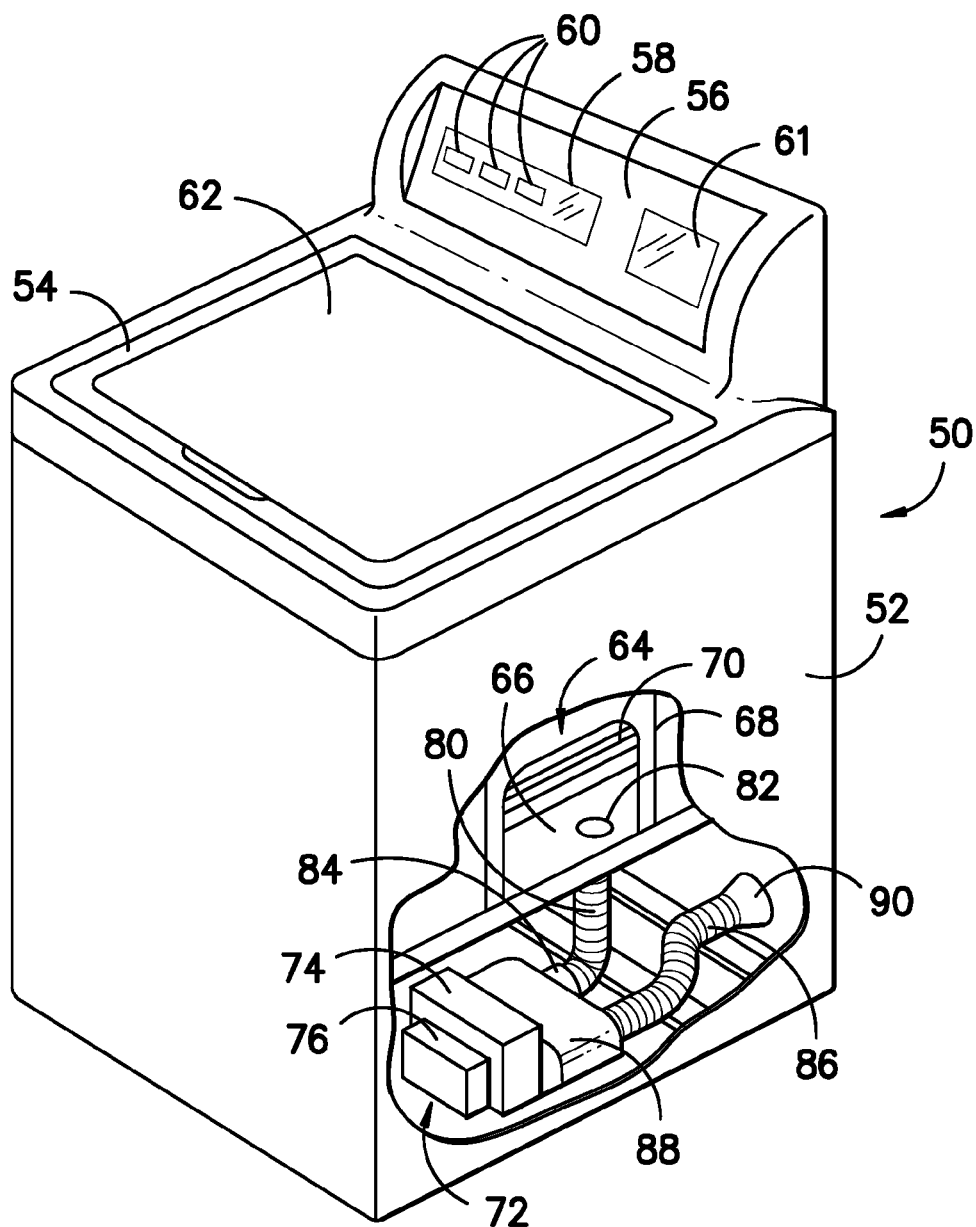
FIG. -1-

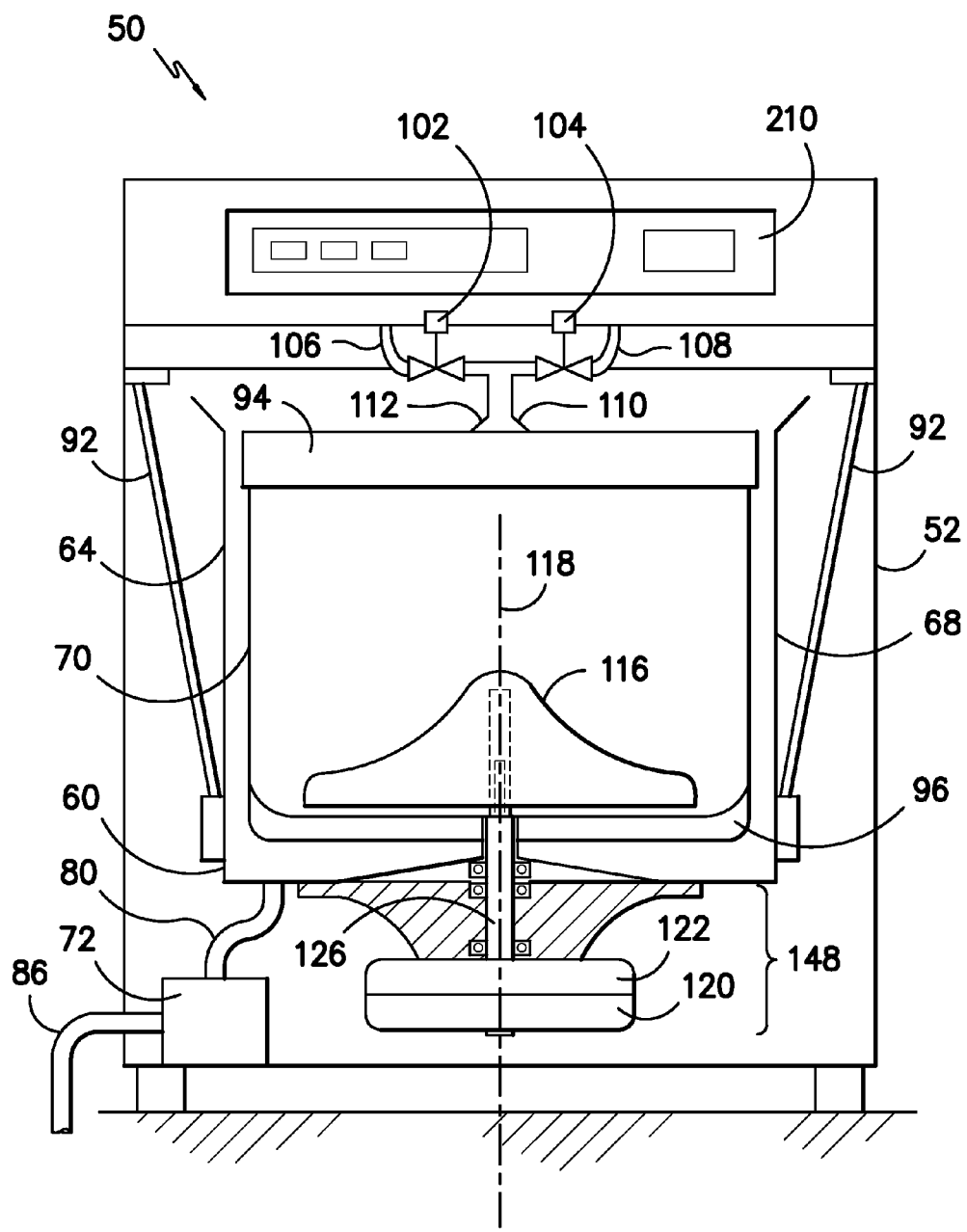
FIG. -2-

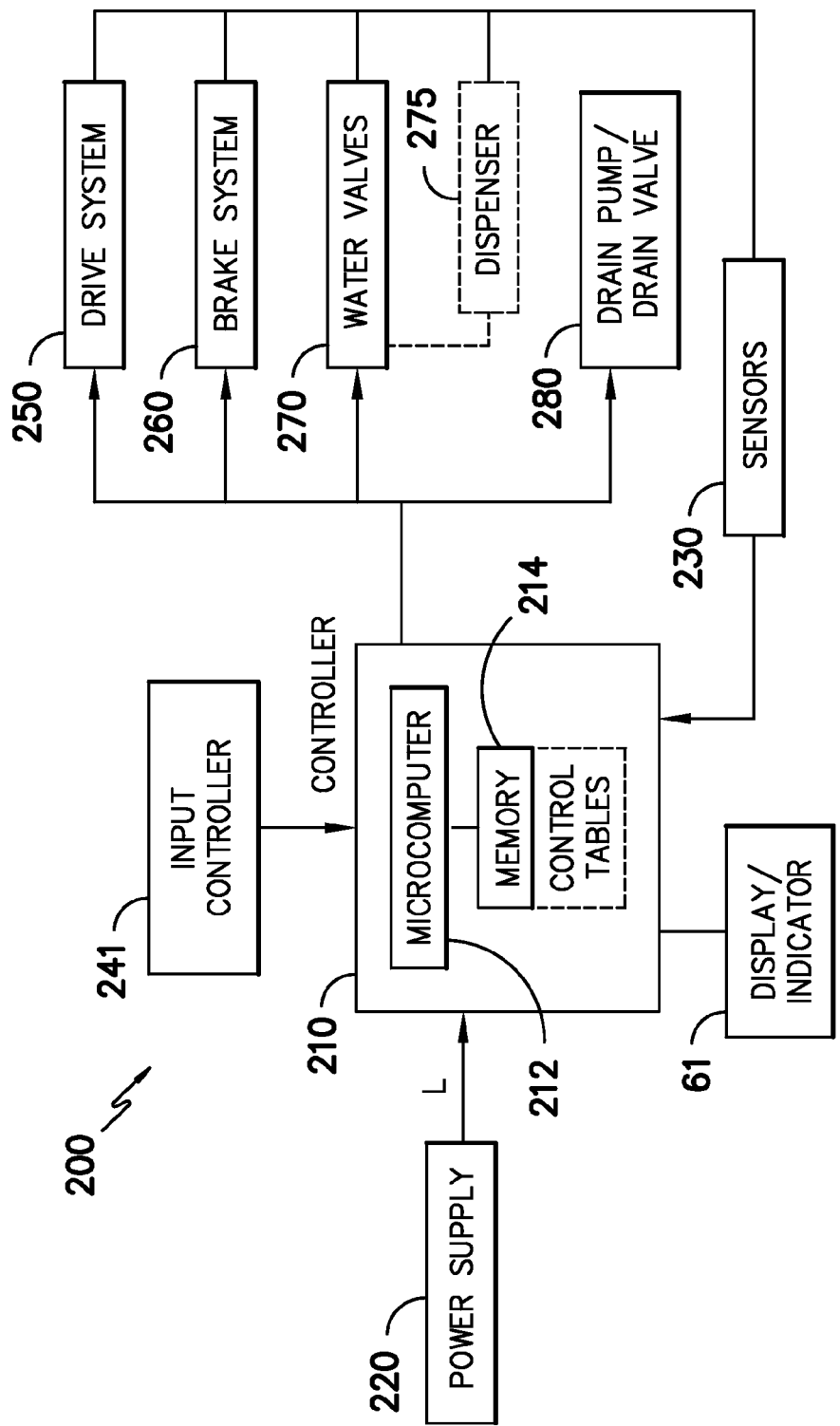
FIG. -3-

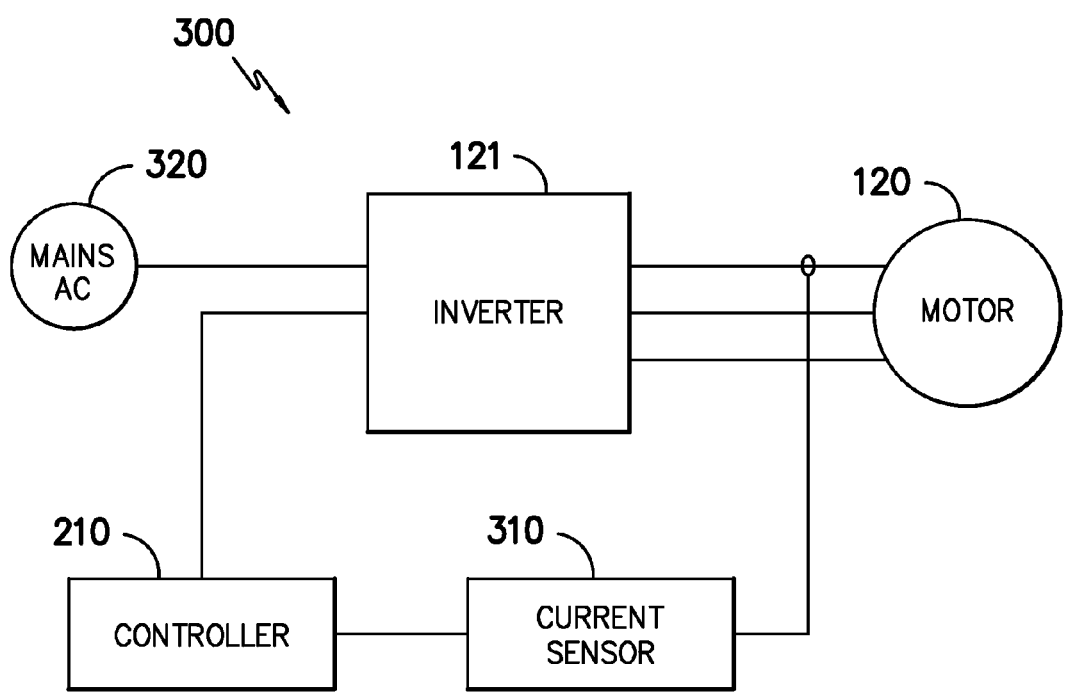
FIG. -4-

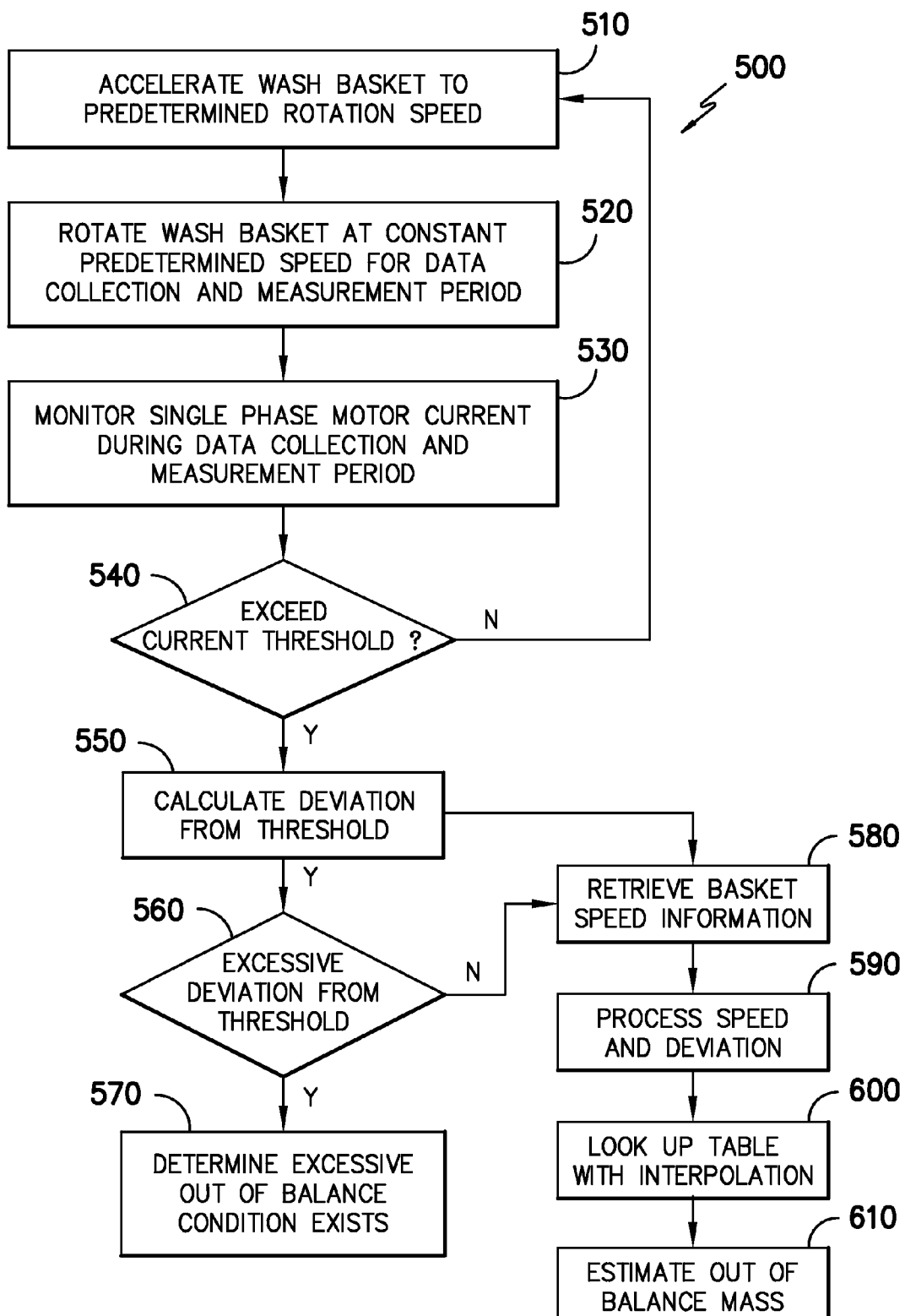
FIG. -5-

SYSTEM AND METHOD FOR DETECTING IMBALANCE IN A WASHING MACHINE

FIELD OF THE INVENTION

The present disclosure relates generally to washing machines, and more particularly to a system and method for detecting out of balance conditions in washing machines.

BACKGROUND OF THE INVENTION

Washing machines typically include a cabinet that receives a tub for containing wash and rinse water. A wash basket is rotatably mounted within the wash tub. A drive assembly and a brake assembly can be positioned with respect to the wash tub and configured to rotate and control the rotation of the wash basket within the wash tub to cleanse the wash load loaded into the wash basket. During a wash cycle, water is typically extracted from the wash load by revolving the wash basket containing the wash load at a high rotational velocity. Centrifugal forces pull the majority of the water out of the wash load and through perforations in the rotating basket. A pump assembly can be used to rinse and drain the extracted water to a draining system.

The rotating basket and wash tub are typically supported by a suspension system designed to dampen translational motion induced by any imbalance within the rotating basket. High stresses are sometimes encountered within the basket, drive system, and suspension system during the high-speed spin action used for water extraction during normal wash cycles. An out of balance mass in the wash load during a high-speed spin cycle can generate significant forces, leading to damage to the washer. For instance, with an imbalance within the wash load, a force is generated which is proportional to the product of the mass, the distance between the imbalance and the center of rotation, and the square of the velocity. Continued spin operation with an out of balance load causes unnecessary wear and tear on mechanical and electrical components in the washer and reduces the reliability of the product over time.

It is known to detect out of balance conditions of a washing machine using dedicated sensors, such as mechanical limit switches to detect tub strikes during an out of balance condition. As used herein, a tub strike is contact between the wash tub and the cabinet while the wash basket is spinning in within the wash tub. Other methods and systems monitor the power and energy that is consumed by the washing machine motor under various operating conditions.

While various methods for detecting an out of balance condition of a washing machine are known, a need exists for an improved method of detecting an out of balance condition of a washing machine. A method that can be performed by the existing inverter drive control system for the washing machine would be particularly useful.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a method for detecting an out of balance condition for a washing machine. The washing machine includes a wash tub, a wash basket rotatably mounted within the wash tub and a polyphase motor configured to rotate the wash basket within the wash tub. The method includes rotating the wash basket at a predetermined rotational speed for a data collection period and monitoring at least a single phase of motor current supplied to the motor while the wash tub rotates at the predetermined rotational speed for the data collection period. The method further includes monitoring the severity of tub strikes based at least in part on the single-phase motor current and detecting an excessive out of balance condition based at least in part on the severity of the tub strikes.

Another exemplary embodiment of the present disclosure is directed to a system for detecting an out of balance condition for a washing machine. The washing machine includes a wash tub, a wash basket rotatably mounted within the wash tub, a polyphase motor configured to rotate the wash basket within the wash tub and an inverter coupled to the polyphase motor. The system includes a controller coupled to the inverter. The controller is configured to control the inverter to operate the polyphase motor to rotate the wash basket at a predetermined rotational speed for a data collection period. The system includes a sensor configured to monitor at least a single phase of motor current supplied to the polyphase motor from the inverter. The sensor provides a signal associated with the single phase of motor current to the controller. The controller is configured to monitor the severity of tub strikes for the washing machine based at least in part on the single phase of motor current. The controller is further configured to detect an excessive out of balance condition based at least in part on the severity of the tub strikes.

Yet another exemplary embodiment of the present disclosure is directed to a washing machine. The washing machine includes a wash tub and a washing basket rotatably mounted within the wash tub. The washing machine includes a polyphase motor configured to rotate the wash basket within the wash tub and an inverter coupled to the polyphase motor. The washing machine further includes a controller coupled to the inverter. The controller is configured to control the inverter to operate the polyphase motor to rotate the wash basket at a predetermined rotational speed for a data collection period. The system includes a sensor configured to monitor at least a single phase of motor current supplied to the polyphase motor from the inventor. The sensor provides a signal associated with the single phase of motor current to the controller. The controller is configured to monitor the severity of tub strikes for the washing machine based at least in part on the single phase of motor current. The controller is further configured to detect an excessive out of balance condition based at least in part on the severity of the tub strikes.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of a washing machine according to an exemplary embodiment of the present disclosure;

FIG. 2 provides a side elevation schematic view of the washing machine of FIG. 1;

FIG. 3 provides of block diagram of an exemplary control system for a washing machine according to an exemplary embodiment of the present disclosure;

FIG. 4 provides a schematic of an exemplary inverter drive control system according to an exemplary embodiment of the present disclosure;

FIG. 5 provides a flow diagram of an exemplary method according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for detecting an excessive out of balance condition for a washing machine and for estimating the amount of out of balance mass in the washing machine. In particular implementations, the out of balance of the washing machine can be monitored using the existing inverter drive control system for the washing machine. The wash basket is rotated at a constant predetermined rotational speed that is known to produce good sensitivity for the purpose of detecting an out of balance condition or for measuring the magnitude of the out of balance load. If the washing machine has a large enough unbalanced load, the wash tub will strike the cabinet. The tub strikes cause the wash basket to lose momentum. The closed loop inverter drive control system causes the inverter to provide more current through the motor phases to the motor to maintain constant speed. This current increase occurs simultaneously with the tub strikes. From the value of the current, the severity or extent of momentum transferred by the tub strikes to the cabinet during a test period can be determined. The out of balance mass of the washing machine can be determined by assessing the severity of the tub strikes based on the single-phase motor current.

FIG. 1 is a perspective view partially broken away of an exemplary washing machine 50 including a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64.

As illustrated in FIG. 1, washing machine 50 is a vertical axis washing machine. While the present disclosure is discussed with reference to a vertical axis washing machine, those of ordinary skill in the art, using the disclosures provided herein, should understand that the subject matter of the present disclosure is equally applicable to other washing machines, such as horizontal axis washing machines.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

FIG. 2 is a front elevational schematic view of washing machine 50 including wash basket 70 movably disposed and rotatably mounted in wash tub 64 in a spaced apart relationship from tub side wall 68 and tub bottom (not shown). Basket 70 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine 50 and, when connected to a building plumbing system (not shown), provide a fresh water supply for use in washing machine 50. Liquid valves 102, 104 and liquid hoses 106, 108 are connected to a basket inlet tube 110, and fluid is dispersed from inlet tube 110 through a known nozzle assembly 112 having a number of openings therein to direct washing liquid into basket 70 at a given trajectory and velocity. A known dispenser (not shown in FIG. 2), may also be provided to produce a wash solution by mixing fresh water with a known detergent or other composition for cleansing of articles in basket 70.

A known agitation element 116, such as a vane agitator, impeller, auger, or oscillatory basket mechanism, or some combination thereof is disposed in basket 70 to impart an oscillatory motion to articles and liquid in basket 70. In different embodiments, agitation element 116 may be a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 116 is oriented to rotate about a vertical axis 118.

Basket 70 and agitator 116 are driven by a motor 120 through a transmission and clutch system 122. In an exemplary embodiment, motor 120 is a polyphase variable speed motor. The motor 120 drives output shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a machine drive system 148.

Basket 70, tub 64, and machine drive system 148 are supported by a vibration dampening suspension system 92. The damping system 92 can include a plurality of damping elements, such as piston-cylinder damping elements, coupled to the wash tub 64. The suspension system 92 can include other elements, such as a balance ring 94 disposed around the upper circumferential surface of the wash basket 70. The balance ring 94 can be used to counterbalance any out of balance condition for the wash machine as the basket 70 rotates within the wash tub 64. The wash basket 70 could also include a balance ring 96 located at a lower circumferential surface of the wash basket 70.

Suspension system 92 operates to dampen dynamic forces as the wash basket 70 rotates within the wash basket 64. The suspension system 92 has various natural operating frequencies of the dynamic system. These natural operating frequencies are referred to as the modes of suspension for the washing machine. For instance, the first mode of suspension for the washing machine occurs when the dynamic system including the wash basket 70, tub 64, and suspension system 92 are operating at the first resonant or natural frequency of the dynamic system. The second mode of suspension for the washing machine occurs when the dynamic system including the wash basket 70, tub, 74, and suspension system 92 are operating at the second resonant or natural frequency of the dynamic system.

Operation of machine 50 is controlled by a controller 210 which is operatively coupled to the user interface input located on washing machine backsplash 56 (shown in FIG. 1) for user manipulation to select washing machine cycles and features. In response to user manipulation of the user interface input, controller 210 operates the various components of machine 50 to execute selected machine cycles and features.

In an illustrative embodiment, laundry items are loaded into basket 70, and washing operation is initiated through operator manipulation of control input selectors 60 (shown in FIG. 1). Tub 64 is filled with water and mixed with detergent to form a wash fluid, and basket 70 is agitated with agitation element 116 for cleansing of laundry items in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with pump assembly 72. Laundry items are then rinsed and portions of the cycle repeated, including the agitation phase, depending on the particulars of the wash cycle selected by a user.

FIG. 3 is a schematic block diagram of an exemplary washing machine control system 200 for use with washing machine 50 (shown in FIGS. 1 and 2). Control system 200 includes controller 210 which may, for example, be a microcomputer 212 coupled to a user interface input 241. An operator may enter instructions or select desired washing machine cycles and features via user interface input 241, such as through input selectors 60 (shown in FIG. 1) and a display or indicator 61 coupled to microcomputer 212 displays appropriate messages and/or indicators, such as a timer, and other known items of interest to washing machine users. A memory 214 is also coupled to microcomputer 212 and stores instructions, calibration constants, and other information as required to satisfactorily complete a selected wash cycle. Memory 214 may, for example, be a random access memory (RAM). In alternative embodiments, other forms of memory could be used in conjunction with RAM memory, including but not limited to flash memory (FLASH), programmable read only memory (PROM), and electronically erasable programmable read only memory (EEPROM).

Power to control system 200 is supplied to controller 210 by a power supply 220 configured to be coupled to a power line L. Analog to digital and digital to analog converters (not shown) are coupled to controller 210 to implement controller inputs and executable instructions to generate controller output to washing machine components such as those described above in relation to FIGS. 1 and 2. More specifically, controller 210 is operatively coupled to machine drive system 250 (e.g., motor, inverter drive, mode shifter, etc.), a brake assembly 260 associated with basket 70, machine water valves 270 (e.g., valves 102, 104 shown in FIG. 2) and machine drain system 280 (e.g., drain pump assembly 72 and/or drain valve 130 shown in FIG. 2) according to known methods. In a further embodiment, water valves 270 are in flow communication with a dispenser 275 (shown in phantom in FIG. 3) so that water may be mixed with detergent or other composition of benefit to washing of garments in wash basket 70.

In response to manipulation of user interface input 241, controller 210 monitors various operational factors of washing machine 50 with one or more sensors or transducers 230, and controller 210 executes operator selected functions and features according to known methods. Of course, controller 210 may be used to control washing machine system elements and to execute functions beyond those specifically described herein. Controller 210 operates the various components of washing machine 50 in a designated wash cycle familiar to those in the art of washing machines.

FIG. 4 depicts a schematic of an exemplary inverter drive control system 300 that forms a part of control system 200 depicted in FIG. 3. Inverter drive control system 300 is used to control inverter 121. Inverter 121 delivers polyphase power to the motor 120 from a mains AC power source 320 and is used to control at least one operating parameter of polyphase motor 120. For instance, inverter 121 can be used to operate motor 120 at a particular rotational speed.

Inverter drive control system 300 includes a feedback system to control operation of motor 120. In the inverter drive control system 300 depicted in FIG. 4, feedback control system includes at least one current sensor 310 configured to monitor the single-phase current supplied to motor 120. According to an exemplary aspect of the present disclosure, an out of balance condition can be detected for the washing machine using the existing inverter drive control system 300 for the washing machine.

In particular, the inverter 121 can be used to control motor 120 to rotate the wash basket 70 at a constant predetermined rotational speed for a data collection period. The predetermined rotational speed of the wash basket 70 is preferably a speed known to produce good sensitivity for the purpose of detecting or measuring an out of balance condition. For instance, the predetermined rotational speed of the wash basket 70 is preferably selected such that the wash tub 64 will strike the cabinet 52 during out of balance conditions for the washing machine. In a particular embodiment, the predetermined rotational speed can be selected such that the washing machine operates at or near the first mode of suspension for the washing machine or the second mode of suspension for the washing machine. In a particular implementation, the predetermined speed can be in the range of about 30 rpm to about 80 rpm or in the range of about 140 rpm to about 180 rpm.

If the wash basket 70 has an unbalanced load, the tub 64 will strike the cabinet 52 as the wash basket 70 rotates in the wash tub 64. The tub strikes cause the wash basket 70 to lose momentum. The inverter drive control system 300 will detect the slowing speed of the wash basket and control the inverter 121 to provide more current through the motor phases to the motor 120 to maintain the rotation of the wash basket 70 at constant speed. The current increase occurs simultaneously with the tub strikes. Accordingly, controller 210 can analyze the severity of the tub strikes by simply analyzing a single phase of motor current supplied from the inverter 121 to the motor 120. Alternatively, the controller 210 can analyze the severity of the tub strike by analyzing more than one phase of motor current supplied from the inverter 121 to the motor 120.

An out of balance condition can be detected and measured by analyzing the severity of the tub strikes during the data collection period. For instance, the sensor 310 can provide a signal to the controller 210 indicative of the magnitude of a single-phase current being supplied to the motor 120. The controller 210 can compare the single-phase current magnitude to a current threshold. The current threshold can be set such that a single-phase current in excess of the current threshold indicates the occurrence of a tub strike. If the current magnitude exceeds the current threshold, the controller 210 can determine the deviation of the current from the current threshold, for instance by determining the difference between the magnitude of the single-phase current and the current threshold. The deviation between the single-phase current and the current threshold provides a measure of the severity of the tub strikes.

The controller 210 can detect an excessive out of balance condition by comparing the deviation of the single-phase current to a current deviation threshold. If the deviation of the single-phase current exceeds the current deviation threshold, the controller 210 can detect an excessive out of balance condition for the washing machine. If an excessive out of balance condition for the washing machine is detected, the controller 210 can control the washing machine to provide an appropriate response to the excessive out of balance condition. For instance, if an out of balance condition is detected, the controller 210 can control the wash basket 70 to stop rotation in the wash tub 64. Alternatively, the controller 210 can control the speed and direction of rotation of the wash basket 70 to alter the distribution of a wash load in the wash basket 70. In yet another embodiment, the controller 210 can send a notification to a user through a suitable alert device, such as audible and/or visual alert device, notifying the user that an out of balance condition exists for the washing machine.

The controller 210 can also estimate the out of balance mass for the washing machine based at least in part on the deviation of the single-phase current from the current threshold. In particular, the controller 210 can receive signals indicative of the single-phase motor current and the predetermined rotational speed of the wash basket 70 within the tub 64. Based on these parameters, the controller can estimate the out of balance mass. For instance, the controller 210 can access a look up table with out of balance mass values determined as a function of single-phase motor current deviation and rotational speed. In this manner, the subject matter of the present disclosure provides for a system for detecting and measuring an out of balance mass using components of the washing machines existing inverter drive control system 300.

FIG. 5 depicts a flow chart of an exemplary workflow 500 for detecting an out of balance condition for the washing machine using the inverter drive control system 300 of FIG. 3. At 510, the wash basket is accelerated to a predetermined speed. As discussed above, the predetermined speed can be a speed that is known to produce good sensitivity for the purpose of detecting an out of balance condition. For instance, the predetermined speed can be in the range of about 30 rpm to about 80 rpm or in the range of about 140 rpm to about 180 rpm.

Once the wash basket has been accelerated to the predetermined speed, the wash basket is rotated at the constant predetermined speed for a data collection period as indicated at 520. The length of the data collection period is preferably long enough to analyze the current associated with the single phase of motor current supplied to the motor. In a particular embodiment, the data collection period is chosen to provide an accurate measure of the single phase of motor current.

At 530, the workflow monitors a single phase of motor current supplied from an inverter to the motor during the data collection and measurement period. At 540, the magnitude of the single phase of motor current is compared to a predetermined current threshold to determine whether the single phase motor current exceeds the current threshold. The predetermined current threshold is set such that a current magnitude in excess of the threshold indicates that a tub strike has occurred. If the single-phase motor current does not exceed the current threshold, the workflow accelerates the wash basket to another predetermined rotational speed as indicated at 510.

Otherwise, the deviation of the single phase of motor current from the current threshold is calculated as shown at 550. The deviation from the current threshold can be calculated, for instance, by determining the difference between the single-phase motor current and the current threshold. The deviation of the single-phase motor current from the current threshold provides a measure of the severity of tub strikes in the washing machine. Accordingly, as discussed below, an out of balance condition can be detected and measured based on the deviation of the single-phase motor current from the current threshold.

For instance, at 560 the workflow determines whether the deviation of the single of phase motor current from the current threshold exceeds a current deviation threshold. If so, an excessive out of balance condition is determined to exist and an appropriate control response is triggered to address the excessive out of balance condition.

Otherwise, the workflow estimates the out of balance mass based on the deviation of the single phase of motor current from the current threshold. For instance, at 580, basket rotational speed information is received. At 590, the current deviation and basket rotational speed information is processed so that a look up table with out of balance mass values can be accessed at 600. The out of balance mass can be estimated from the look up table based on the basket rotational speed and deviation of the single-phase motor current as shown at 610.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting an out of balance condition for a washing machine, the washing machine comprising a wash tub, a wash basket rotatably mounted within the wash tub, and a polyphase motor configured to rotate the wash basket within said wash tub, the method comprising:

rotating the wash basket at a predetermined rotational speed for a data collection period;

monitoring at least a single phase of motor current supplied to the motor while the wash tub rotates at the predetermined rotational speed during the data collection period;

monitoring the severity of tub strikes based at least in part on the single phase motor current; wherein monitoring the severity of tub strikes comprises comparing the single phase of motor current to a current threshold and determining the deviation of the single phase of motor current from the current threshold; and detecting an excessive out of balance condition based at least in part on the severity of the tub strikes; wherein detecting an excessive out of balance condition comprises detecting an excessive out of balance condition if the deviation of the single phase of motor current exceeds a current deviation threshold.

2. The method of claim 1, wherein the single phase of motor current is supplied from an inverter coupled to the motor.

3. The method of claim 1, wherein the method comprises accelerating the wash basket to a second predetermined rotational speed if the single phase of motor current does not exceed the current threshold.

4. The method of claim 1, wherein the method comprises estimating the out of balance mass of the washing machine based at least in part on the deviation of the single phase of motor current from the current threshold.

5. The method of claim 1, wherein the single phase of motor current is monitored by a current sensor that is part of an inverter drive control system for the polyphase motor.

6. The method of claim 1, wherein the predetermined rotational speed is selected such that the washing machine operates at about the first mode of suspension for the washing machine or the second mode of suspension for the washing machine.

7. The method of claim 1, wherein the predetermined rotational speed is within a range of about 30 rpm to about 80 rpm or about 140 rpm to about 180 rpm.

8. A system for detecting an out of balance condition for a washing machine, the washing machine comprising a wash tub, a wash basket rotatably mounted within the wash tub, a polyphase motor configured to rotate the wash basket within the wash tub and an inverter coupled to the polyphase motor, the system comprising:

a controller coupled to the inverter, the controller configured to control the inverter to operate the polyphase motor to rotate the wash basket at a predetermined rotational speed for a data collection period;

a sensor configured to monitor at least a single phase of motor current supplied to the motor from the inverter, the sensor providing a signal associated with the single phase of motor current to said controller;

wherein said controller is configured to monitor the severity of tub strikes based at least in part on the single phase of motor current by comparing the single phase of motor current to a current threshold, and determining the deviation of the single phase of motor current from the current threshold; and wherein said controller is further configured to detect an excessive out of balance condition if the deviation of the single phase of motor current exceeds a current deviation threshold.

9. The system of claim 8, wherein the controller is configured to estimate the out of balance mass of the washing machine based at least in part on the deviation of the single phase of motor current from the current threshold.

10. The system of claim 8, wherein the predetermined rotational speed is selected such that the washing machine operates at about the first mode of suspension for the washing machine or a second mode of suspension for the washing machine.

11. The system of claim 8, wherein the predetermined rotational speed is within a range of about 30 rpm to about 80 rpm or about 140 rpm to about 180 rpm.

12. A washing machine, comprising:

a wash tub;

a wash basket rotatably mounted within the wash tub;

a polyphase motor configured to rotate the wash basket within said wash tub;

an inverter coupled to the polyphase motor;

a controller coupled to the inverter, the controller configured to control the inverter to operate the polyphase motor to rotate the wash basket at a predetermined rotational speed for a data collection period; and a sensor configured to monitor at least a single phase of motor current supplied to the polyphase motor from the inverter, the sensor providing a signal associated with the single phase of motor current to the controller;

wherein said controller is configured to monitor the severity of tub strikes based at least in part on the single phase motor current by comparing the single phase of motor current to a current threshold; and determining the deviation of the single phase of motor current from the current threshold; and wherein the controller is further configured to detect an excessive out of balance condition detect an excessive out of balance condition if the deviation of the single phase of motor current exceeds a current deviation threshold.

13. The washing machine of claim 12, wherein the predetermined rotational speed is selected such that the washing machine operates at about the first mode of suspension or the second mode of suspension for the washing machine.

* * * * *